INVENTOR
EDWARD G. ZEY

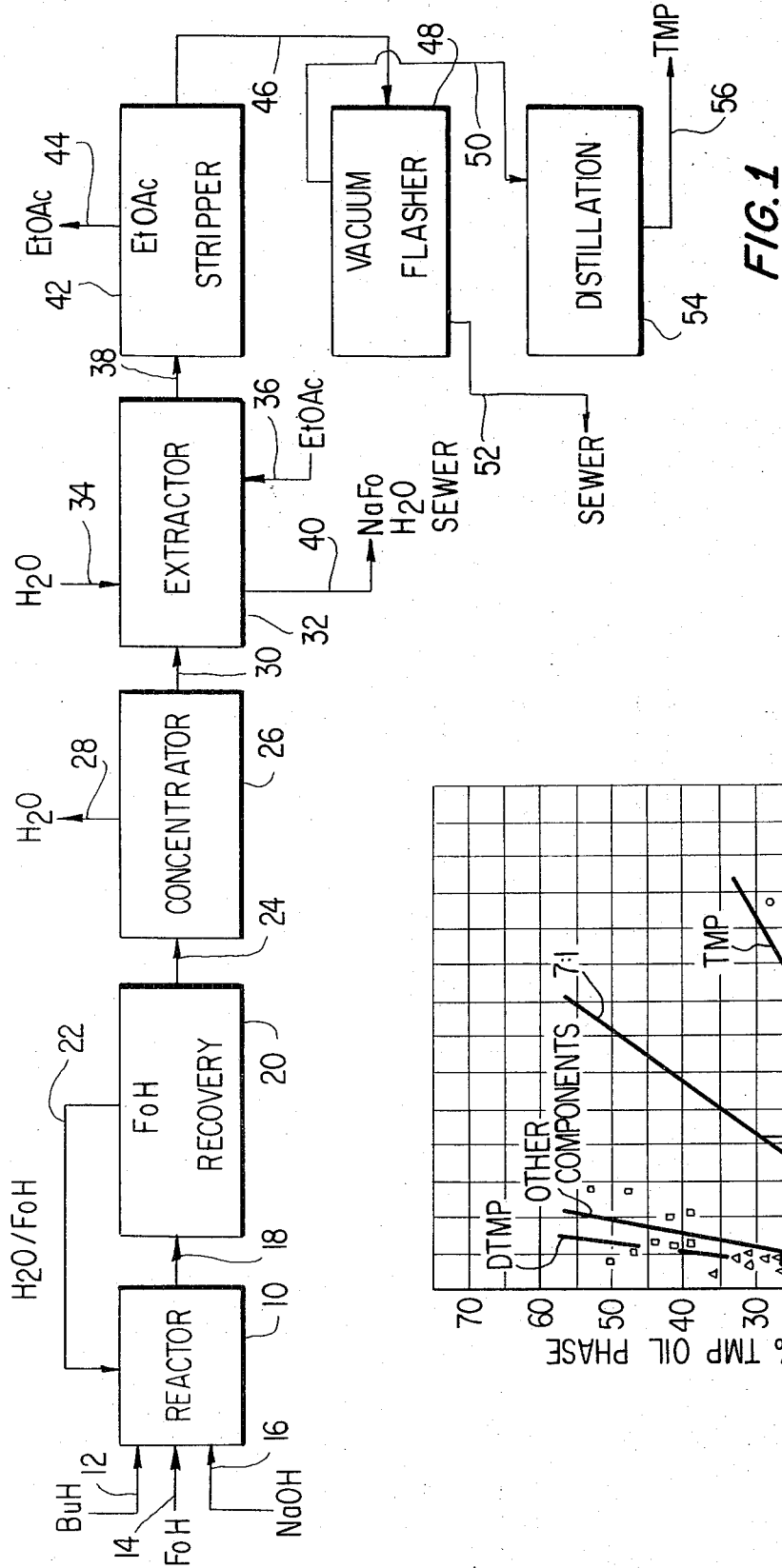
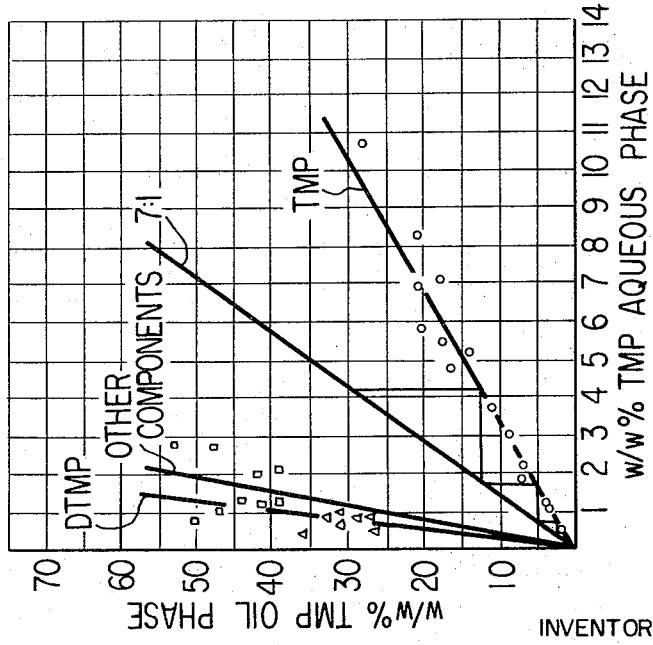

3,829,507
DI-TRIMETHYLOLPROPANE
Edward Gustave Zey, Corpus Christi, Tex., assignor to Celanese Corporation, New York, N.Y.
Filed Mar. 16, 1971, Ser. No. 124,688
Int. Cl. C07c 43/00, 41/12
U.S. Cl. 260—615 R                        3 Claims

ABSTRACT OF THE DISCLOSURE

Production of di-trimethylolpropane and recovery thereof in significant quantities; further, in the production of trimethylolpropane the improvement comprising recovering from the reaction mixture di-trimethylolpropane in crystalline form.

BACKGROUND OF THE INVENTION

Trimethylolpropane is conventionally manufactured by reacting formaldehyde with butyraldehyde in the presence of a metal hydroxide, preferably sodium hydroxide. The basic reaction involves reacting three moles of formaldehyde with one mole of butyraldehyde and in the presence of one mole of sodium hydroxide to produce one mole of trimethylolpropane and one mole of sodium formate. The reaction is normally carried out in aqueous solution with an excess of formaldehyde in the reaction mixture.

The conventional manufacturing process for trimethylolpropane may be best understood by reference to FIG. 1. Reference numeral 10 designates the reactor in which the basic reaction is carried out. Butyraldehyde is introduced into reactor 10 through line 12, formaldehyde is introduced into reactor 10 through line 14 and sodium hydroxide in aqueous solution is introduced into reactor 10 through line 16. The resultant reaction mixture is then passed from reactor 10 through line 18 to tower 20 in which excess formaldehyde and water are stripped from the reaction mixture and passed through line 22 as a recycle stream to the reactor 10. The stripped reaction mixture is then passed through line 24 to concentrator 26 wherein excess water is stripped from the reaction mixture and withdrawn through line 28. The resultant reaction mixture from concentrator 26 is then passed through line 30 to extractor 32. Water is added to extractor 32 through line 34 at the upper portion of the extractor tower 32 and ethyl acetate is added to extractor 32 through line 36 to the lower portion of the extractor tower 32. Most of the organic components of the reaction mixture are dissolved in the ethyl acetate to form a lighter oil-layer which is withdrawn overhead from extractor 32 through line 38. A heavier aqueous layer comprising water and by-product sodium formate from the reaction is withdrawn from the bottom of extractor 32 through line 40. This waste material from the reaction is normally discarded to the sewer.

The oil-layer withdrawn from extractor 32 is then passed to ethyl acetate stripper 42 wherein ethyl acetate is stripped from the reaction mixture and withdrawn through overhead line 44. The stripper reaction mixture is then passed from stripper 42 through line 46 to vacuum flasher 48. The major proportion of the trimethylolpropane produced in the manufacturing process is flashed overhead through line 50 separating it from the less volatile reaction products which are withdrawn as a blow-down through line 52 at the bottom of vacuum flasher 48. Conventionally, the heavier reaction products withdrawn through line 52 have been discarded to the sewer. The timethylolpropane product flashed in vacuum flasher 48 is then passed to vacuum distillation column 54 to produce a purified trimethylpropane product which is withdrawn from distillation column 54 through line 56. The blow-down taken in vacuum flasher 48 which is withdrawn through line 52 is necessary to remove small quantities of sodium formate which, if not removed, would disrupt the vacuum distillation carried out in distillation column 54. More particularly, the presence of sodium formate would lead to the decomposition of trimethylolpropane leading to the formation of volatile products at the temperatures and pressures involved in the operation of distillation column 54. The distillation column 54 is normally operated at a vacuum in the range of about 4 millimeters of mercury and the vacuum flasher 48 is normally operated at this same pressure and at a temperature of about 190° C. It is to be noted that a significant volume of organic products and by-products of the main reaction must necessarily be discarded to the sewer through line 52 from the vacuum flashing step carried out in vacuum flasher 48.

SUMMARY OF THE INVENTION

The present invention relates to di-trimethylolpropane and to a process for recovering same in significant quantities from a reaction mixture containing trimethylolpropane.

It is an object of the present invention to produce white crystalline di-trimethylolpropane.

It is a further object of the present invention to produce di-trimethylolpropane by recovering this product from the reaction mixture produced in the manufacture of trimethylolpropane.

BRIEF DESCRIPTION OF THE DRAWINGS

The present invention will be best understood by reference to the following drawings.

FIG. 1 as discussed previously, illustrates the process conventionally employed for the manufacture of trimethylolpropane.

FIG. 3 represents a graph presenting equilibrium data on trimethylolpropane.

DESCRIPTION OF THE INVENTION

Figure 2:
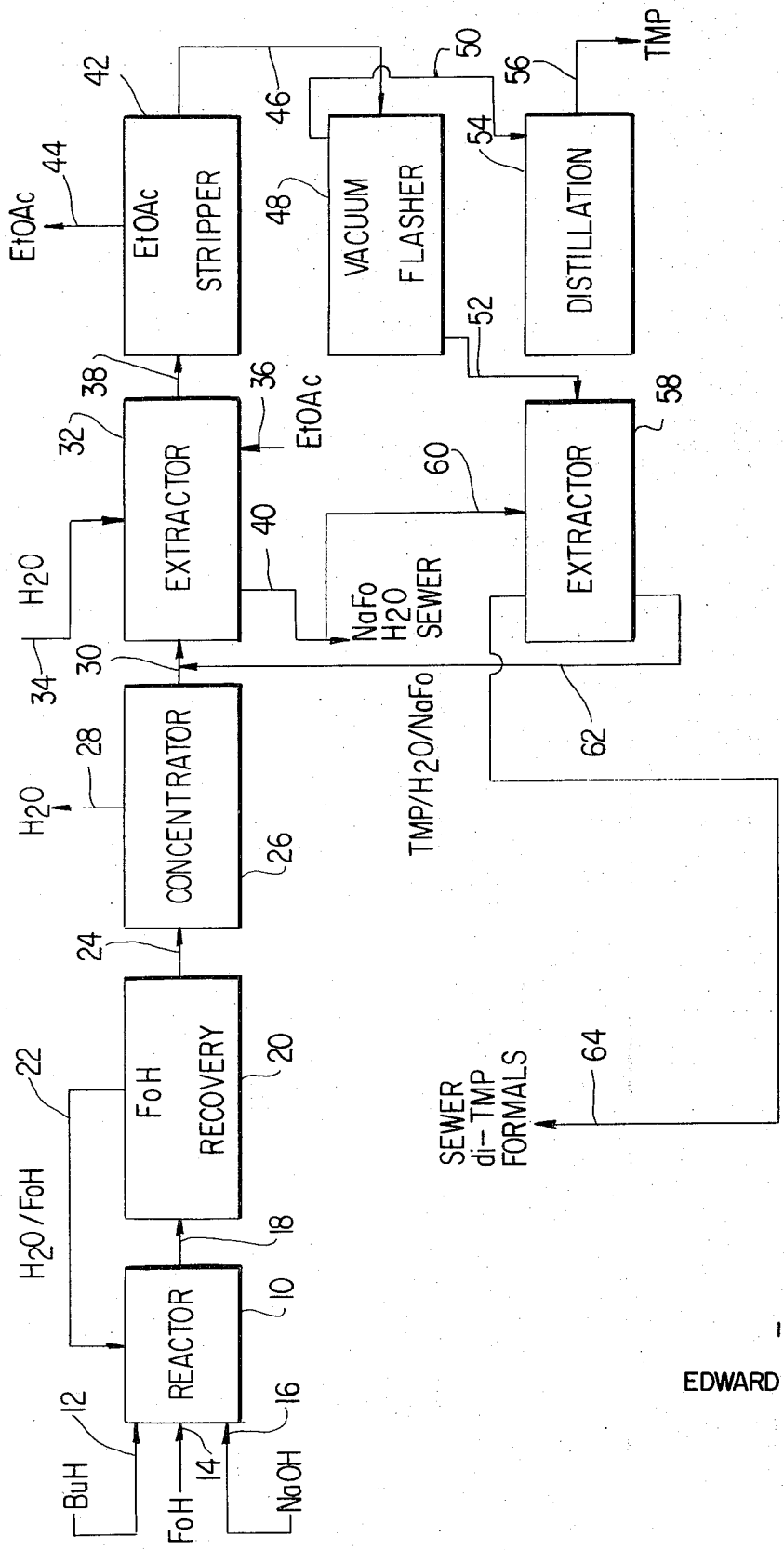
FIG. 2 illustrates an improved process whereby additional amounts of trimethylolpropane are recovered in the manufacturing process for trimethylolpropane.

Now referring to FIG. 2, reference number 58 designates an extractor or extraction column. The reaction mixture residue which is withdrawn from the bottom of vacuum flasher 48 through line 52 is introduced into the bottom of extractor 58. A portion of the aqueous sodium formate solution withdrawn from the bottom of extractor 32 through line 40 is passed through line 60 into the upper portion of extractor 58. An aqueous solution containing sodium formate and trimethylolpropane, representing the extract stream, is withdrawn from the bottom of extractor 58 by means of line 62. Preferably this stream is recycled to the main process through line 30 to extractor 32. The raffinate from the extraction step is withdrawn overhead from extractor 58 by means of line 64.

The operating conditions for extractor 58 are selected to generally maximize the amount of recovery of trimethylolpropane from the reaction mixture residue stream withdrawn from vacuum flasher 48. Generally, the extraction is carried out at atmospheric pressures, although higher or lower pressures may be employed if desired. The extraction is normally carried out at elevated temperatures, preferably in the range of 60° C. to 90° C.

The reaction mixture residue withdrawn from vacuum flasher 48 is generally soluble in water; however, if an aqueous solution of sodium formate is employed in which the concentration of sodium formate is at least about 25 percent by weight, phase separation will occur to produce an oil layer and an aqueous layer. A series of runs was made using the reaction mixture residue withdrawn from vacuum flasher 48 and various concentrations of aqueous sodium formate. More particularly, in a series of experiments, 100 grams of reaction mixture residue was mixed at 60° C. with 800 gm. of aqueous sodium formate solutions containing respectively 10, 20, 30 and 35 weight percent sodium formate. Results of these experiments indicated that there was no phase separation at the 10 and 20 percent concentrations; however, at 30 percent there was good phasing and the settling rate was fair and at 35 weight percent concentration of sodium formate the phasing was good and the settling rate was good. These experiments also indicated that trimethylolpropane was preferentially extracted from di-trimethylolpropane and other organic components of the reaction mixture residue withdrawn from the bottom of vacuum flasher 48.

A mixture of 370 gm. of aqueous sodium formate solution (containing about 30% by weight of sodium formate) withdrawn from the bottom of extractor 32 and 740 grams of reaction mixture residue withdrawn from vacuum flasher 48 was mixed for 30 minutes and settled for 15 minutes at 80° C. A one gram sample of the upper oil phase was taken and submitted for analysis. Two samples of the lower aqueous phase were taken; the first sample was submitted for determining percentage trimethylolpropane, the second sample was extracted with ethyl acetate and the extract stripped and submitted for analysis for di-trimethylolpropane. The aqueous phase was discarded and fresh aqueous phase was added to effect an additional extraction to obtain additional data. Further additional extractions were also conducted and analyzed to obtain additional data. Also, additional samples of sodium formate solutions and reaction mixture residues from a commercial process were utilized in a series of extraction steps to obtain additional data. The results of these studies are set forth in Table I. It is to be noted that the existence of di-trimethylolpropane had been previously unknown, although the basic process has been in commercial use for many years. Analysis of commercial reaction mixture residue from vacuum flasher 48 indicated that this compound existed in substantial proportions in this stream. Likewise, analysis of the trimethylolpropane product from distillation tower 54 indicated the presence of trace quantities of di-trimethylolpropane.

TABLE I.—TMP EQUILIBRIUM DATA

| Experiment | Oil layer,* percent | | | | Aqueous layer,* percent | | |
|---|---|---|---|---|---|---|---|
| | TMP | DTMP | Other components | H²O | TMP | DTMP | Other components |
| 1 | 21.8 | 26.5 | 41.7 | 10.0 | 7.0 | 0.57 | 1.11 |
| 2 | 18.1 | 27.1 | 44.8 | 10.0 | 7.2 | 0.94 | 1.22 |
| 3 | 21.9 | 28.6 | 39.5 | 10.0 | 7.0 | 1.02 | 1.22 |
| 4 | 20.5 | 30.1 | 39.4 | 10.0 | 5.9 | 1.00 | 2.12 |
| 5 | 13.9 | 28.6 | 47.5 | 10.0 | 5.3 | 0.97 | 2.74 |
| 6 | 15.3 | 32.2 | 42.5 | 10.0 | 4.8 | 0.94 | 1.90 |
| 7 | 8.9 | 30.9 | 50.2 | 10.0 | 3.1 | 0.64 | 0.64 |
| 8 | 7.1 | 36.0 | 46.9 | 10.0 | 1.9 | 0.39 | 1.03 |
| 9 | 3.2 | 33.81 | 53.0 | 10.0 | 1.1 | | |
| 10 | 1.8 | 33.7 | 64.5 | 10.0 | 0.6 | | |
| 11 | 28.5 | 23.1 | 38.4 | 10.0 | 10.7 | | |
| 12 | 21.4 | 27.2 | 41.4 | 10.0 | 8.4 | | |
| 13 | 17.5 | 25.2 | 47.3 | 10.0 | 5.5 | | |
| 14 | 11.0 | 31.0 | 48.0 | 10.0 | 3.8 | | |
| 15 | 6.9 | 34.4 | 48.7 | 10.0 | 2.3 | | |
| 16 | 3.8 | 32.7 | 53.5 | 10.0 | 1.3 | | |

* All percentages are w./w.

The resultant data is also summarized in graphical form in FIG. 3 which illustrates the trimethylolpropane equilibrium data obtained at 80° C. Equilibrium values presented in FIG. 3 show that trimethylolpropane can be selectively extracted from di-trimethylolpropane and other heavy ends. The preferred ratios of aqueous formate to oil would range from 5:1 to 10:1. A case for 7:1 is illustrated indicating four stages would be needed to reduce trimethylolpropane from 30 percent to 1 percent in the raffinate. Similarly, five stages of extraction would be necessary to reduce trimethylolpropane from 40 percent to 1 percent in the raffinate.

Generally, the content of trimethylolpropane contained in the reaction mixture residue withdrawn from vacuum flasher 48 will be in the range of about 20 to 50 percent by weight. Normally, the concentration of trimethylolpropane will be in the range of about 30 to 40 percent by weight. Generally, the amount of di-trimethylolpropane in the reaction mixture residue will be in the range of about 10 to 45 percent by weight. Normally, it will be in the range of about 20 to 35 percent by weight. The remainder of the organic components in the reaction mixture residue are believed to be cyclic and linear formals primarily.

A series of experiments was carried out in which trimethylolpropane-enriched reaction mixture residues from vacuum flasher 48 were extracted with aqueous sodium formate solution withdrawn from the bottom of extractor 32. In one of these experiments the trimethylolpropane-enriched reaction mixture residue contained 54 percent by weight of trimethylolpropane. In the second experiment, the trimethylolpropane-enriched reaction mixture residue contained 89 percent by weight of trimethylolpropane. In the first experiment, phasing occurred when the enriched reaction mixture residue contained 54 percent trimethylolpropane. On the other hand, no phasing occurred in the case where the enriched residue contained 89 percent trimethylolpropane. This data establishes that with the reaction mixture residues which are normally involved, containing in the range of 20 to 50 percent trimethylolpropane, phasing will occur and reasonable rates of settling can be achieved.

Figure 4:
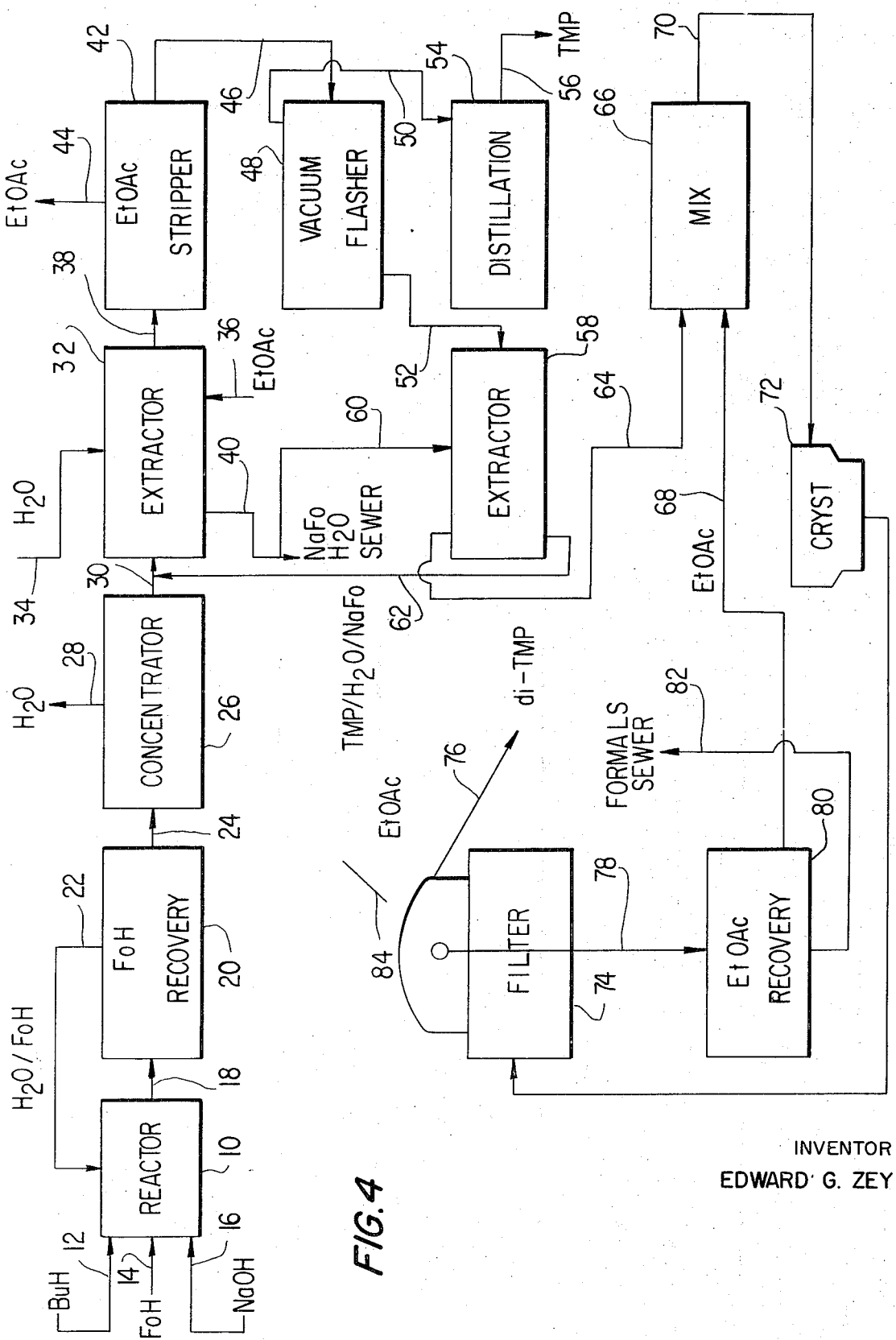
FIG. 4 illustrates the improvement in accordance with the present invention by which novel di-trimethylolpropane is recovered from the reaction mixture residue produced in the manufacture of trimethylolpropane.

Now turning to FIG. 4, reference numeral 66 designates a mixing tank. The reaction mixture residue from which trimethylolpropane has been extracted in extractor 58 and which is withdrawn from the top thereof and passed through line 64 is passed into the mixing tank 66. Also, ethyl acetate is added to mixing tank 66 through line 68. The addition of the ethyl acetate to the reaction mixture residue in mixing tank 66 initiates the crystallization of di-trimethylolpropane. The mixture in mixing tank 66 is then passed through line 70 to holding tank 72 from which the mixture is subsequently passed through filter 74. Further crystallization of di-trimethylolpropane occurs in holding tank 72. In filter 74, the di-trimethylolpropane crystals are filtered from the mixture and withdrawn therefrom via outlet means 76. The filtrate from the filtering operation is passed through line 78 to tower 80 in which ethyl acetate is stripped from the filtrate and removed via line 68 for recycling to the mixing tank 66. The reaction mixture residue contained in the filtrate stream passed through line 78 to tower 80 is withdrawn from the bottom of tower 80 through line 82. As mentioned preivously, the residue withdrawn from the bottom of tower 80 comprises primarily cyclic and linear formals which are then discarded to the sewer or are otherwise removed. If desired, the di-trimethylolpropane crystals separated in filter 74 may be washed with additional ethyl acetate sprayed on the crystals by means of line 84.

The following experiment was carried out on the separation of di-trimethylolpropane from the reaction mixture residue: 430 grams of reaction mixture residue withdrawn from the bottom of vacuum flasher 48 were extracted with aqueous sodium formate solution (containing about 30% by weight of sodium formate) at 80° C. to remove trimethylolpropane. The resulting oil layer was treated with 250 milliliters of ethyl acetate, allowed to stand for approximately five hours, filtered and washed with fresh ethyl acetate to produce 51 grams of di-trimethylolpropane

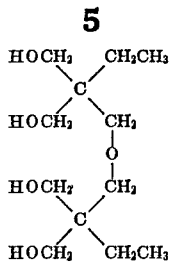

having a melting point in the range of 96° C. to 97° C. A sample of this material was further washed with fresh ethyl acetate, filtered and dried to produce di-trimethylolpropane as a white crystalline solid having a melting point in the range of 101° C. to 104° C.

The process for separating di-trimethylolpropane from the reaction mixture residue withdrawn from the top of extractor 58 can be carried out at atmospheric pressure and atmospheric temperature, although higher or lower temperatures and pressures may be utilized if desired. The proportion of ethyl acetate to reaction mixture residue is normally selected to be in the range of about 0.1:1 to 5:1, preferably in the range of about 0.5:1 to 5:1. The time involved in the crystallization step carried out in hopper tank 72 is not particularly critical, the longer the period the mixture is allowed to stand the greater will be the degree of crystallization. Also, the lower the temperature of the mixture in hopper tank 72, the greater will be the degree of crystallization of the di-trimethylolpropane.

The di-trimethylolpropane product recovered in the present process is useful as a crosslinking agent in polymeric paints and coatings. Fatty acid esters thereof may be used as lubricants in high-speed turbine engines.

Although the present invention has been particularly described in the form of preferred embodiments, it is to be understood that the invention is not restricted to these specific embodiments and that many variations are possible with the skill of the art. For example, metal hydroxides other than sodium hydroxide may be utilized in the basic manufacturing process for the production of trimethylolpropane, such as other alkali metal hydroxides, e.g., potassium hydroxide; alkaline earth metal hydroxides, e.g., calcium hydroxide, barium hydroxide and the like. Further, as indicated previously, the extraction process carried out in extractor 58 may be carried out in one or more stages, utilizing conventional extractor apparatus. In addition, compounds other than ethyl acetate may be utilized in the precipitation or crystallization step in which di-trimethylolpropane is precipitated from the mixture. Examples of such other compounds which may be used in addition to ethyl acetate include: ketones, such as acetone; ethers, such as diethyl ether; other esters, such as $n$-amyl acetate; and other like media. The primary desired properties of these compounds, i.e., inert organic liquid media, include:

(1) The compound should be generally liquid at ambient temperatures and pressures,
(2) Di-trimethylolpropane should be generally insoluble in the compound, and
(3) Other components of the reaction mixture residue should generally be freely soluble in the compound.

Described hereinabove as a preferred embodiment is the second separation step of removing more trimethylolpropane before treating the reaction mixture residue from vacuum flasher 48 with ethyl acetate to precipitate di-trimethylolpropane. If desired the second separation step is eliminated and the reaction mixture residue from vacuum flasher 48 fed directly to mixing tank 66 and treated as described hereinbefore to precipitate crystalline di-trimethylolpropane in crystallizer 72. The product, of course, contains trimethylolpropane in minor proportions, the product comprising at least about 70%, by weight, di-trimethylolpropane, generally from 85 to 95% di-trimethylolpropane in crystalline form. Similarly, any conventional techniques of separating crystals from liquids may be utilized such as rotary filters, filter presses and the like which are well known to those skilled in the art. Thus, the present invention is not to be construed to be limited strictly to the foregoing specific descriptions but rather by the appended claims.

What is claimed is:
1. A method for recovering di-trimethylolpropane from a mixture comprising about 20 to 50 percent trimethylolpropane and about 10 to 45 percent di-trimethylolpropane, which method comprises:
   adding to said mixture an inert liquid medium which is a member of the group consisting of ethyl acetate, acetone, diethyl ether, and amyl acetate, in a proportion of about 0.1 to 5 parts of said liquid per part of said mixture to precipitate crystalline di-trimethylolpropane from said mixture; and
   filtering the crystalline di-trimethylolpropane crystals from the resulting mixture of liquid and crystals.
2. The method of claim 1 wherein the liquid medium is ethyl acetate.
3. The method of claim 1 wherein the ethyl acetate is added to the trimethylolpropane-containing mixture in a proportion of about 0.5 to about 5 parts of ethyl acetate per part of said mixture.

References Cited

UNITED STATES PATENTS

| | | | |
|---|---|---|---|
| 3,097,245 | 7/1963 | Russell et al. | 260—615 R |
| 3,082,259 | 3/1963 | Bauer et al. | 260—637 P |
| 3,183,274 | 5/1965 | Robeson | 260—637 P X |
| 3,076,854 | 2/1963 | Klein | 260—637 P |
| 2,930,818 | 3/1960 | Wust | 260—637 P |
| 2,749,370 | 6/1956 | Brendlein et al. | 260—615 R |

FOREIGN PATENTS

| | | | |
|---|---|---|---|
| 816,208 | 7/1959 | Great Britain | 260—637 P |
| 816,209 | 7/1959 | Great Britain | 260—637 P |
| 1,019,452 | 2/1966 | Great Britain | 260—615 |

OTHER REFERENCES

Vysotskii et al., Chem. Abs. 70, 114519b, 1969.

HOWARD T. MARS, Primary Examiner

U.S. Cl. X.R.

252—56; 260—488 J, 637